United States Patent [19]

McCullough et al.

[11] 4,199,785

[45] Apr. 22, 1980

[54] ELECTRONIC ZOOM SYSTEM

[75] Inventors: John B. McCullough, Marlboro; John Merchant, Needham, both of Mass.

[73] Assignee: Honeywell Inc., Minneapolis, Minn.

[21] Appl. No.: 1,049

[22] Filed: Jan. 5, 1979

[51] Int. Cl.² .................. H04N 5/22; H04N 3/22; H04N 5/33
[52] U.S. Cl. .................. 358/180; 250/333; 358/113; 358/183
[58] Field of Search .............. 358/180, 183, 22, 113; 250/333, 334

[56] References Cited

U.S. PATENT DOCUMENTS

| 2,510,670 | 6/1950 | Trott | 358/180 |
| 3,497,614 | 2/1970 | Petrocelli et al. | 358/180 |
| 3,654,386 | 4/1972 | Baum | 358/183 |

*Primary Examiner*—John C. Martin
*Attorney, Agent, or Firm*—Charles J. Ungemach

[57] ABSTRACT

A zoom system is provided which utilizes wide angle and narrow angle vidicon cameras, a display and an electronic system under an operator's control which operates to blend and magnify signals from the cameras so as to provide the viewer with a zoom capability for the display without effective loss of resolution.

11 Claims, 9 Drawing Figures

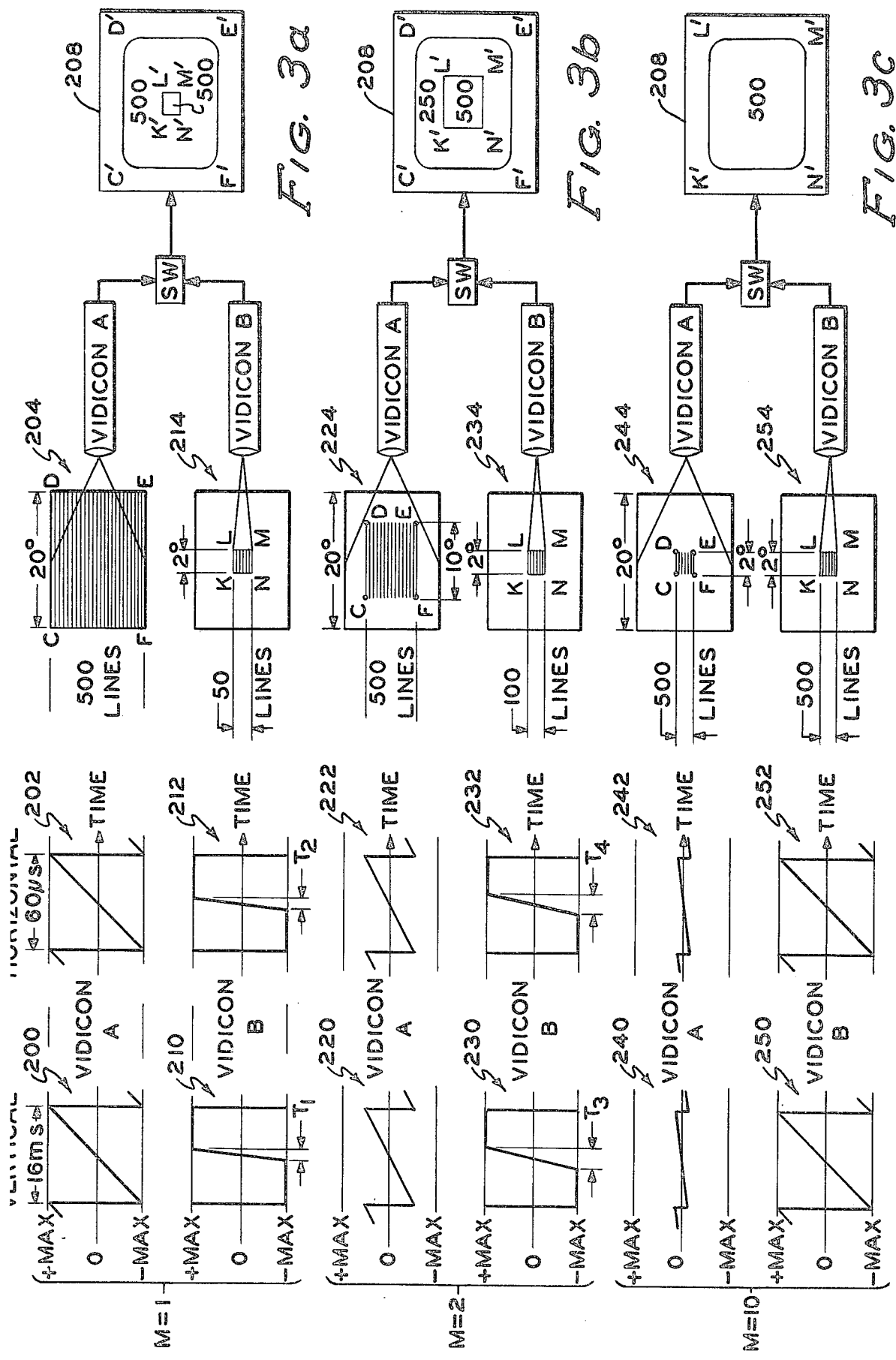

ELECTRONIC ZOOM SYSTEM

BACKGROUND OF THE INVENTION

The present invention relates generally to a television system which can be used by a viewer so as to zoom on subjects within the field of view of the cameras and increase the magnification of the image being viewed without effective loss of resolution so as to see the magnified image in greater detail than was possible in prior art electronic zoom systems. The system is operable with both optical and infrared type imaging systems and may be employed in not only the standard television viewing situation but also in imaging systems such as FLIR (forward looking infrared radar) used in ground search operations from aircraft.

Electronic zoom systems are old in the art and examples can be found in U.S. patents such as: U.S. Pat. Nos. 2,510,670 issued to B. S. Trot, June 16, 1950; 3,497,614 issued to E. A. Petrocelli et al, Feb. 24, 1970 and 3,654,386 issued to M. Baum, Apr. 4, 1972. The prior art electronic zoom systems have encountered a difficulty when attempts are made to magnify images within the field of view because the number of scan lines is not increased and the loss of resolution which accompanies the magnification produces an image which has no more information than was in the original picture. Therefore, while the picture size may be increased, there is no more detail to be observed and the magnification does not produce the desired benefit. Accordingly, most television systems that require zoom capability utilize a standard optical zoom system on the television vidicon cameras. The optical systems are rather expensive and are, furthermore, under the camera operator's control rather than the viewer's control.

SUMMARY OF THE INVENTION

The present invention provides a system which can produce electronic zooming under the viewer's control and do so without effective loss of resolution. The system employs two vidicon cameras, one with a wide field of view and the other with a narrow field of view. The cameras are boresighted so that the field of view of the small field camera is within, and usually centered in, the field of view of the larger field camera. The video signals from the camera having a wide field of view are predominately used when no zoom is employed and principally fill the viewing area on the display so as to produce a normal unmagnified picture. It may be desirable to allow some of the video signal from the narrow field of view camera to be mixed in the magnified scene so that a small portion, usually at the center of the display, contains the portion of the scene viewed by the narrow field of view camera. As the operator increases the zoom, more of the video signal from the narrow field of view camera fills the central portion of the display while less of the video signal from the wide field of view camera occupies the space around the now magnified central portion. At maximum magnification, the video signal from the narrow field of view camera is providing substantially the entire picture over the display and at full magnification. At no magnification, the horizontal and vertical scan signals, which are being used to drive the narrow field of view vidicon, are clipped so that in effect the narrow field of view camera is overscanning and the number of lines per unit area of the display from the narrow field of view camera is equal to the number of lines per unit area of the display from the wide field of view camera. As the magnification is increased, the drive signals to the narrow field of view camera become less and less clipped so that more and more of the video signal from the narrow field of view camera is used in the display. The number of lines per unit area of the display remains the same so that in the central portion of the display, the resolution remains unchanged. At final full magnification, substantially all of the video signal from the narrow field of view camera is being used and the deflection signals driving that camera are now substantially unclipped so that the number of lines per unit area of the display, over the entire surface of the display, is as it was when only the signals from the wide field of view camera were being used. Thus the same resolution is provided for the closeup magnified image as was available when the system was not zoomed.

BRIEF DESCRIPTION OF THE DRAWINGS

FIGS. 3a, 3b and 3c show the drive signals to the vidicon cameras at magnifications of 1, 2 and 10 respectively and also show the scan and display area associated with each magnification;

DETAILED DESCRIPTION OF THE PREFERRED EMBODIMENT

Figure 1A:
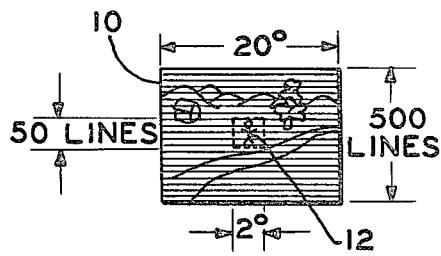
FIGS. 1a and 1b show a representation of a scene and a magnified portion of the scene respectively as was obtainable with the electronic zoom systems of the prior art.
Figure 1B:
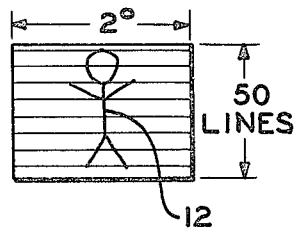

FIGS. 1a and 1b show the problem that was encountered in electronic zoom systems of the prior art. In FIG. 1a, a display area 10 is shown containing a scene of a house, tree and a small FIG. 12. It is presumed that the field of view being displayed on the screen is 20 degrees while the space occupied by the small FIG. 12 upon whom it is desired to zoom occupies a two degree field or 10 percent of the large field. It is also presumed that the display area uses 500 lines of scanning from top to bottom so that the number of lines for the small FIG. 12 would be ten percent of this or 50.

FIG. 1b shows the scene when electronic magnification from the prior art is employed. It is seen that the small FIG. 12 is now greatly increased in size so that what was occupying two degrees of space is now spread to occupy the entire viewing area. However, it should be noticed that the number of scan lines available for viewing still remains the same 50 lines that occupied the small two degree space in FIG. 1a. Because of this, no greater amount of detail is available in the magnified image of FIG. 1b than was available in FIG. 1a and the zooming does not produce the desired effect. The present invention provides the image of FIG. 12 in the same magnification but with a full 500 lines of scan so that the detail and resolution of the magnified picture is as great as the original wide field picture.

Figure 2:
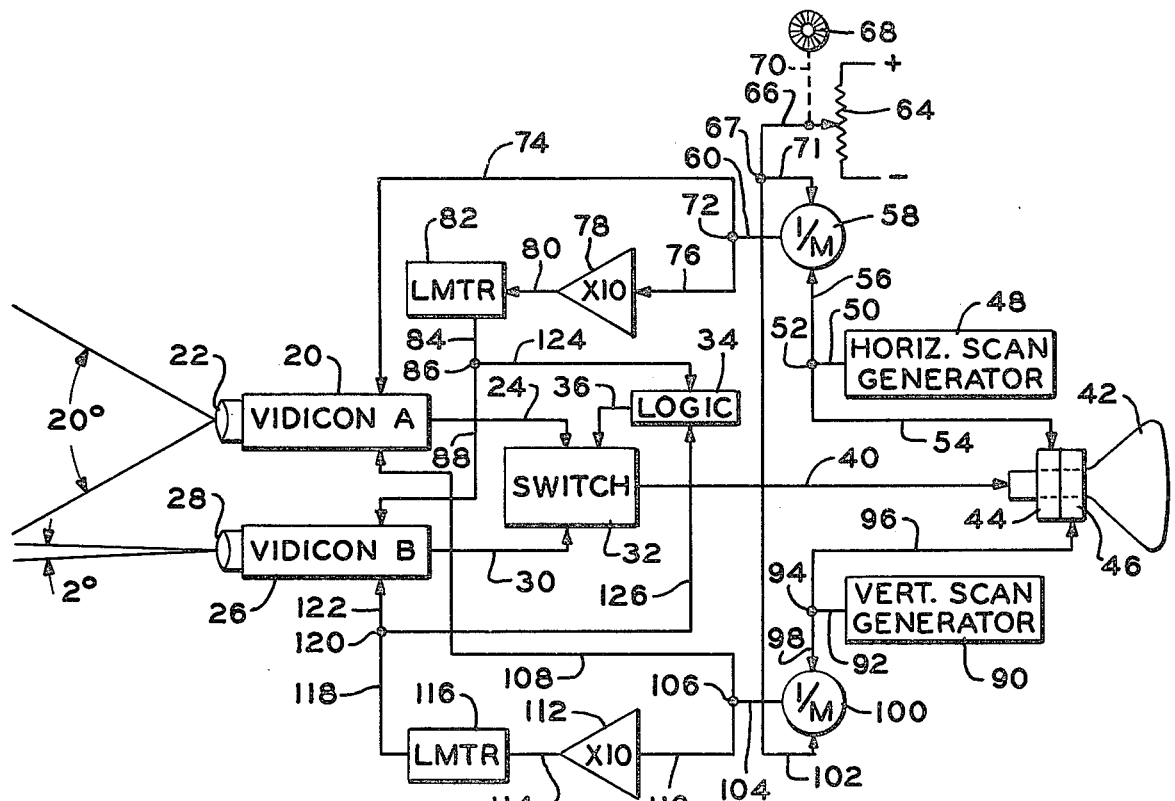
FIG. 2 shows a schematic diagram of one embodiment of the present invention.

FIG. 2 is a schematic drawing of one embodiment of the present invention in which a first vidicon tube 20, identified as vidicon A, is shown having a fixed lens 22 and an output on a line 24. Vidicon A has a relatively wide field of view which has been chosen in FIG. 2 to be represented by an angle of 20 degrees. A second vidicon tube 26, identified as vidicon B, is shown having a fixed lens 28 and an output on a line 30. Vidicon B has a relatively narrow field of view which has been chosen in FIG. 2 to be shown as an angle of two degrees. In addition to the cost advantage, the use of fixed lenses provides additional advantages over standard zoom lens systems in that fixed lenses produce a higher quality picture than are obtainable with a zoom lens system and because there are no moving parts. The outputs of vidicons A and B on lines 24 and 30 are connected to a box 32 labelled "switch" which may be a standard electronic switch which is operable upon receiving an input from logic circuitry 34 over a line 36 to connect either the output of vidicon A on line 24 or the output of vidicon B on line 30 to the output of the switch 32 on line 40. Logic 34, as will be later described, operates to connect the output of vidicon A to the output of switch 32 whenever the drive signals to vidicon B are clipped but operates to connect the output of vidicon B to the output of switch 32 whenever the signals driving vidicon B are not clipped.

The output of switch 32 on line 40 is connected to the input of a monitor display tube 42 which has horizontal deflection coils 44 and vertical deflection coils 46 associated therewith. A horizontal scan generator 48 is shown having an output on a line 50 connected to a junction point 52. Junction point 52 is connected by line 54 to the horizontal deflection coil 44 of monitor tube 42 so as to produce the horizontal deflections of the beam in tube 42 in a standard fashion. Junction point 52 is connected by a line 56 to a variable gain or dividing device 58. Variable gain device 58 operates to produce an output on a line 60 which varies inversely with an input M representative of a desired magnification. The value of M is selected by the operator or viewer and is derived from a potentiometer 64 having a wiper arm 66 connected to a junction point 67 and the position of wiper 66 is under the control of the operator via a knob 68 and a mechanical connection 70. As the operator turns knob 68, a voltage representative of the desired magnification M will be fed from wiper 66 to junction point 67 and through a line 71 to the variable gain device 58 so that an output appears on line 60 representative of a value 1/M times the signal from the horizontal scan generator 48. Thus, if M were chosen to be 1, the output on line 60 would be the same as the output of horizontal scan generator 48. On the other hand, if M were chosen as 10, then the output of the horizontal scan generator 48 on lines 50 and 56 would be decreased in magnitude by a factor of 10 so that a 1/10th size signal would appear on line 60.

The signal on line 60 is fed to a junction point 72 and over a line 74 to the horizontal drive input of vidicon A. Thus, when the gain of the system is chosen at 1, the horizontal scan generator 48 will drive vidicon A in a standard fashion over its full range. On the other hand, if the magnification were chosen at 10, a 1/10th size drive signal would drive vidicon A so as to scan only 1/10th of the field of view it receives.

Junction point 72 is connected by a line 76 to an amplifier 78 which operates to multiply the signal it receives by 10 and produce this amplified signal on a line 80 which is connected to a limiter 82 identified by a box with the designation "LMTR". The output of limiter 82 will normally be a clipped version of the input it receives, the amount of clipping depending upon the size of the signal or line 80. In the present example, the limiter 82 is set to clip signals greater than the signal produced by the horizontal scan generator 48. If the magnification is 10, then the signal at junction point 72 is 1/10th of the normal output of horizontal scan generator 48 so that the output of amplifier 78 on line 80 would be 10 times this reduced signal or, in effect, a signal equal to that appearing at the output of horizontal scan generator 48. Under these circumstances, the limiter 82 will not clip any of the signal and thus the output appearing on line 84 will be the same as the output of horizontal scan generator 48. On the other hand, when magnification is chosen at a lesser value, then the signal on line 80 at the output of amplifier 78 will be larger and the limiter 82 will perform some clipping function. The variations in the output of limiter 82 will be better seen in connection with description of FIGS. 3a, 3b and 3c hereinafter. The output of limiter 82 on line 84 is connected to a junction point 86 and from junction point 86 by a line 88 to the horizontal drive terminal of vidicon B. When the signal appearing at the output of limiter 82 on line 84 is not clipped, then vidicon B will be scanning its field of view in a normal fashion. However, when the horizontal drive signal is clipped, then vidicon B will be overscanned and the number of scan lines that it uses to scan the scene it views will be diminished. If it is assumed that 500 scan lines are employed, then when no clipping occurs, the output of vidicon B on line 30 will contain 500 lines. On the other hand, when the magnification is 1, a great deal of clipping occurs by the limiter 82 and the number of lines employed by vidicon B to detect the image will result in a signal on line 30 containing only 50 lines.

A vertical scan generator is shown in FIG. 2 in a box identified by reference numeral 90 and has an output on a line 92 connected to a junction point 94. Junction point 94 is connected by a line 96 to the vertical deflection coil 46 of the display tube 42. The vertical scan generator 90 operates to deflect the vertical beam in display tube 42 in a standard fashion.

Junction point 94 is also connected by a line 98 to a variable gain device 100 which is similar to variable gain device 58. Variable gain device 100 receives a signal indicative of the value M from the wiper arm 66 through junction point 67 and a line 102 and produces an output on a line 104 indicative of the signal from vertical scan generator 90 divided by M. Thus, the signal on line 104 will be the same as the output of vertical scan generator 90 whenever M is 1 but will be of reduced magnitude as the operator chooses higher values of M. The signal on line 104 is presented to a junction point 106 which is connected by a line 108 to the vertical drive input of vidicon A. Thus, as was the case with the horizontal scan, vidicon A will be driven in a normal fashion whenever the value of M is 1 but will receive a reduced magnitude drive signal as the value of M increases.

Junction point 106 is connected by conductor 110 to an amplifier 112 which amplifies the size of the signal by a factor of 10 to produce an output on a line 114 equal to ten times the size of the signal on line 110. Line 114 is connected to a limiter 116 identified as a box containing the letters "LMTR". The output of limiter 116 is fed by line 118 through a junction point 120 and a line 122 to the vertical drive input of vidicon B. As was the case in connection with limiter 82, limiter 116 is set to have no effect if the signal on line 114 is of the same magnitude as the output of vertical scan generator 90 which condition occurs whenever the value of M is chosen to be 10. Limiter 116 will, however, clip signals to a greater or lesser extent whenever the value of M is less than 10 so that vidicon B will drive in a normal fashion only when the value of M is ten and will overscan at other values to produce signals on line 30 representative of an underscanned picture.

Logic circuit 34 is connected to junction point 86 at the output of limiter 82 by a line 124 and is connected to junction point 120 at the output of limiter 116 by a line 126. Logic 34 detects when either of the outputs of limiters 82 and 116 are performing a clipping action and when this occurs produces a signal on line 36 which will operate switch 32 so as to assure that the output of vidicon A is connected to the display tube 42. At other times, when the signals at the outputs of limiters 82 and 116 are both not clipped, then switch 32 will receive a signal from logic circuit 34 causing the output of vidicon B to be connected to the display tube 42. The operation of logic circuit 34 will be explained in connection with FIG. 4 below.

As will be noted in the description of the apparatus of FIG. 2, certain assumptions have been made. It has been assumed, for example, that the number of scan lines being employed is 500, that the field of view of vidicon A is 20 degrees while the field of vidicon B is two degrees and that the desired magnitude change of the system is between 1 and 10 and that amplifiers 78 and 112 have been chosen to have a gain of 10. It will be readily understood that different numbers of scan lines may be employed, different fields of view of vidicons A and B may be employed and that the magnification may be between different limits and amplifiers 78 and 112 may be varied accordingly.

Referring now to FIGS. 3a, 3b and 3c, the drive signals to vidicon A and vidicon B will be described and the affect that they have on the presentation to signals to the display monitor. In connection with FIGS. 3a, 3b and 3c, it will be again assumed that the field of view of vidicon A is 20 degrees whereas the field of view of vidicon B is two degrees. It will also be assumed that there are 500 scan lines for the full heighth of the vidicons and the display and for simplicity it will be assumed that a scan is completed by drawing all 500 lines in consecutive order rather than as is presently the case in most television systems which scan alternate or odd numbered lines to produce a first frame followed by the other alternate or even numbered lines to produce a second frame interlaced with the first. The system will work with the two interlaced frame concept and, of course, will function equally well with different fields of view and different numbers of scan lines, but the chosen presumptions will simplify the understanding of the invention. FIGS. 3a, 3b and 3c have been arranged vertically so that the outputs of the limiters of FIG. 2 can be better compared. In all of the figures, the far lefthand figure represents the vertical input to the vidicon in question whereas the next column represents the horizontal input to the vidicon in question. The vertical input is graphed against time from a minimum to a maximum voltage in each case over one cycle which is chosen to take 30 milliseconds. The horizontal inputs have been graphed from a minimum to a maximum voltage against time for one cycle which will then take 60 microseconds. The third column of the figure shows the fields of view seen by the vidicons and the number of lines involved in the scan. The vidicons are each shown connected to the switch and to the display unit in the last column which shows the view seen by the viewer with the resolution in terms of the number of lines of scan viewed.

FIG. 3a shows the situation when the gain of the system is chosen at 1. The upper lefthand graph 200 shows the signal on line 108 of FIG. 2 which is the signal driving the vertical deflection of vidicon A. With a gain of 1, it is seen that it extends in a sawtooth fashion from the plus maximum to the minus maximum over the 16 millisecond cycle and is not reduced in magnitude. In similar fashion, the graph 202 shows the waveform of the signal on line 74 when the gain is 1 to be a sawtooth signal extending from the plus maximum to the minus maximum over the 60 microsecond cycle and is not reduced in magnitude. Under these conditions, the scan by vidicon A will be over the entire field of view as is seen in the portion of FIG. 3a by reference numeral 204. Here it is seen that vidicon A scans the entire 20 degree field of view over the area C, D, E, F and produces 500 lines of scan. This signal will be fed through the switch to the display unit identified by reference numeral 208 and will show the scene being viewed by vidicon A between the points on the display identified by C', D', E' and F'. This will be a full 500 line scan for full resolution.

On the lefthand lower portion of FIG. 3a, a graph 210 is shown which represents the wave shape of the signal on line 122 comprising the vertical drive for vidicon B. Since the gain is unity, the signal at the output of amplifier 112 of FIG. 2 will be at a maximum and the maximum amount of clipping will occur in the limiter 116. This is seen in the graph 210 of FIG. 3a by a wave shape which changes from the minus maximum to the plus maximum during only a small portion $T_1$ of the cycle time. The rest of the cycle is spent dwelling at the plus maximum or minus maximum levels. In similar manner, the graph 212 shows the wave shape of the signal appearing on line 88 which forms the horizontal drive input for vidicon B. Since the gain is unity, the output of amplifier 78 will be its maximum and the maximum amount of clipping will occur in limiter 82 of FIG. 2. Thus, the wave shape is such that a change from minus maximum to plus maximum occurs only during a small portion $T_2$ of the cycle with the remaining portion of the cycle dwelling either at the minus maximum or the plus maximum. The effects of this may be seen in the portion of FIG. 3 identified by reference numeral 214 where vidicon B is shown scanning the small 2 degree area K, L, M, N at the center of the area being viewed by vidicon A. Area K, L, M, N constitutes only about 10 percent of the view of vidicon A. Since the drive signals to vidicon B have been clipped about 90 percent of the time, instead of there being 500 scan lines for vidicon B, only 10 percent of these are available and accordingly the output of vidicon B will consist of 50 lines expressing the view seen in the area K, L, M and N. Because of the logic circuitry 34 of FIG. 2, a view seen by vidicon B is presented in FIG. 3a to the display unit 208 only at times $T_1$ and $T_2$ when the signals in graphs 210 and 212 are both not clipped. This occurs in both cases at the central 10 percent of the scan and thus in monitor 208, the small area will be viewed in an area identified by the letters K', L', M' and N' in the center portion of the view seen by vidicon A. If everything is properly adjusted and vidicons A and B properly boresighted, then the view will appear to the viewer to be an undisturbed view without magnification at any part of the scene being viewed. Since only 50 lines of scan are being produced by vidicon B, there will only be 50 lines viewed in the area K', L', M' and N', but since this is only 10 percent of the total screen view, the line density will be the same as that coming from vidicon A; i.e., 500 lines per full heighth. To show this in FIG. 3a, the number 500 has been placed in the upper righthand corner of the view C', D', E' and F' and in the small box K', L', M' and N'. Thus at magnification of 1, the viewer will only see the scene as if it had all come from vidicon A; that is, an unmagnified and undisturbed scene. There may be certain misalignments, differential brightness and differential resolution problems that will cause the viewer to see a small "window" around the area K', L', M' and N' but this can be useful since it will show the viewer where it is that he will be zooming when he operates the proper controls.

FIG. 3b shows the situation when the magnification is changed to 2. When M equals 2, the output of variable gain device 58 and variable gain device 100 will be half of the outputs of the horizontal and vertical scan generators 48 and 90 respectively. This is seen in FIG. 3b in the upper lefthand graph identified by reference numeral 220 as a sawtooth signal which is the signal appearing on line 108 and constituting the vertical drive for vidicon A, but having a magnitude only about half of what it was when the gain was 1. Likewise, in the next adjacent graph identified by reference numeral 222, the signal appearing on line 74 of FIG. 2 constituting the horizontal scan input for vidicon A, is seen to be a sawtooth signal having only about half of the magnitude that it did when the magnification was 1. Because of this, vidicon A will only scan about half of the field of view that it is capable of scanning although it will utilize the full 500 lines of scan power to do so. This is seen in the portion of FIG. 3b identified by reference numeral 224 where vidicon A is seen to be viewing the full 20 degree field but is only scanning the portion identified with the letters C, D, E and F which is seen to constitute about 10 degrees or half of the field of view presented to vidicon A. The scan over the area C, D, E and F is nevertheless 500 lines so that the density of scan is substantially doubled. Vidicon A's output is passed through the switch to the display 208 and because of the scanning that occurs within the monitor receiver, the view seen by vidicon A will be expanded out to fill the entire screen within the area C', D', E', F'. Although the density of scan of vidicon A was doubled, the amount of information available has not changed and when the signal is expanded out to cover areas C', D', E', F', there will be a loss of resolution so that the effective density of the lines in monitor 208 will be approximately half of what they were before. This is seen by the number 250 in the upper righthand corner of this area. It should be noted, however, that this loss in resolution occurs in the peripheral area at a time when the viewer is zooming so that it is not necessary to have as fine a resolution because the viewer's attention will normally be directed at the magnified central portion which, as will be explained, will remain at the high resolution of 500 lines per full heighth. During zooming, the peripheral area is used mainly to orient the viewer in the field and great detail in the peripheral area is not needed. For comparison purposes it is noted that with conventional optical zoom (using a zoom lens) there is also some loss of peripheral resolution during zoom, caused by smearing in the vidicon as the edge detail "zooms" (i.e., moves) out of the edges of the picture.

The lower lefthand graph of FIG. 3b, identified by reference numeral 230, shows the signal appearing on line 122 which forms the vertical scan drive for vidicon B. It is seen that because the size of the signal appearing at the input of amplifier 112 of FIG. 2 has decreased, the size of the signal appearing on line 114 will have decreased and limiter 116 will do less clipping than it did in the case when the magnification was unity. This is seen in graph 230 by the time $T_3$ during which the sawtooth changes from a minus maximum to a plus maximum. $T_3$ occupies approximately one fifth of the entire scan and the dwell times at the minus maximum and plus maximum on either end of the scan is reduced accordingly. Similarly, the next adjacent graph, identified by reference numeral 232, shows the signal that appears on line 88 forming the horizontal scan drive for vidicon B. Here again the amount of time spent dwelling at the minus maximum and plus maximum has been reduced and the time $T_4$, which represents the active scan time between minus maximum and plus maximum during the cycle, is about twice as large as what it was in graph 212. The results of this are seen in the portion of FIG. 3b identified by reference numeral 234 where vidicon B is shown viewing the same 2 degrees or 10 percent of the view seen by vidicon A and again identified by the area K, L, M, N, but because the scan is more active than it was before, 100 lines will be generated by vidicon B as opposed to the 50 lines that were generated in FIG. 3a. Again, the logic circuitry 34 of FIG. 2 will cause the switch to pass the signals from vidicon A to the monitor 208 at all times when there is clipping and pass the signals of vidicon B to monitor 208 at times $T_3$ and $T_4$ when there is no clipping. The result is that the size of the area viewed by vidicon B will double and will now occupy about 1/5th of the total screen (in linear dimension) available as seen in FIG. 3b by the area K', L', M', N'. While only 100 lines will exist in this area since the area is 1/5th of the total screen, the line density will remain at 500 lines per full screen thus producing the same amount of resolution as was the case in FIG. 3a. It is thus seen that the central portion of the screen has now produced an image which is twice as large as it was in FIG. 3a and with the same amount of resolution or line density.

This process will continue as the operator turns knob 68 of FIG. 2 to produce greater and greater magnifications with the amount of clipping of the vertical and horizontal inputs to vidicon B decreasing with increasing magnification so that more and more of the output of vidicon B will appear in expanded form on monitor 208 while less and less of the output of vidicon A will be seen in the periphery. As the magnification increases, the line density of the peripheral area around the central area will continue to deteriorate but by the time it approaches 50 lines per full screen height, the central area is substantially completely filling the screen. Furthermore, as explained above, it is the peripheral area during the zoom that is deteriorating not the central area where the detail is desired and accordingly the deterioration of the signal from vidicon A is not objectionable.

The maximum amount of magnification which, in the present example is chosen to be 10, is shown in FIG. 3c. In the upper lefthand portion of FIG. 3c, in a graph identified by reference numeral 240, the signal appearing on line 108 representing the vertical drive for vidicon A is shown. It is seen that this sawtooth wave has now decreased in magnitude to where it is only approximately 1/10th of the size it was when the magnification was unity. Similarly, in the graph identified by reference numeral 242, showing the signal appearing on line 74, the horizontal scan drive for vidicon A, is seen that the magnitude of the signal has dropped to about 1/10th of what it was before. The result of this is seen in the portion of FIG. 3c identified by reference numeral 244 where vidicon A is shown still viewing the 20 degree scene but the portion of active scan of vidicon A has now been reduced to a small area of about 2 degrees again identified by the letters C, D, E, F. Although the scan has been reduced to that size. the number of lines of scan produced by vidicon A is still 500 lines. This signal is not passed through the switch at all since, as will be seen, there is no clipping of the signal to vidicon B and accordingly the logic 34 of FIG. 2 provides that vidicon B signal is presented to monitor 208 at all times. If desired, the limiters 82 and 116 could be set to do a little clipping even at full magnification so that there would be a small peripheral area on monitor 208 from vidicon A and if this were done, the density of lines in the periphery would have affectively fallen off to approximately 50 for the full vertical heighth since vidicon A's output is being stretched over ten times the area that it is effectively scanning.

In the lower portion of FIG. 3c, a graph 250, shows the wave shape of the signal appearing on line 122 of FIG. 2 representing the vertical drive input to vidicon B. It will be seen that since the size of the signal at the input of amplifier 112 of FIG. 2 has decreased to 1/10th of the output of vertical scan generator 90 by operation of the variable gain device 100. Amplification by amplifier 112 will restore the signal to its full magnitude on line 114 with the result that limiter 116 now sees the signal small enough that no clipping occurs. This is seen in graph 250 as a sawtooth extending from the plus maximum to the minus maximum in normal fashion. Likewise, in graph 252, representing the signal on line 88 which comprises the horizontal scan drive input for vidicon B, the wave shape is a normal sawtooth wave extending between plus maximum and minus maximum in a standard way. The results of this are seen in the portion of FIG. 3c identified by reference numeral 254 where the vidicon B is still shown scanning the same two degrees in the area K, L, M, and N but now since there is no overdriving of vidicon B, its full 500 lines of scan are used in scanning this area. The result is that this signal is presented to the monitor 208 and now fills the entire area K', L', M', N' to show a magnified version of the scene being viewed in the two degree area but with a resolution of 500 lines for full heighth. Thus it is seen that going from a magnification of 1 all the way up through a magnification of 10 provides for a continually zoomed or magnified image of the central area of the screen but with the same amount of resolution in all cases; i.e., 500 lines per full height.

Figure 4:
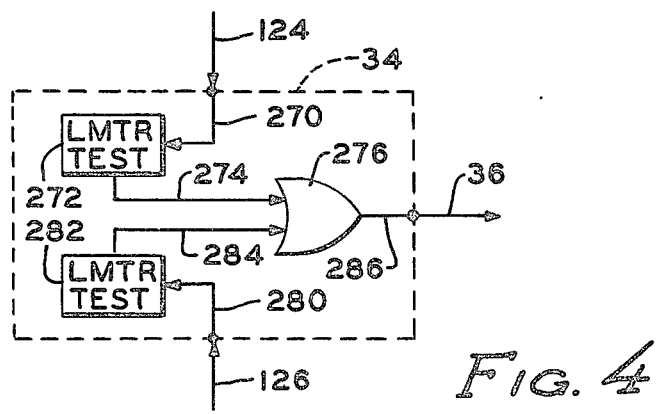
FIG. 4 shows a schematic of a logic circuit used in connection with the circuit of FIG. 2.

Referring now to FIG. 4, the logic circuitry 34 of FIG. 2, which is operable to produce a signal so that switch 32 will connect the output of vidicon A to the input of the display tube 42 whenever horizontal or vertical clipping occurs in the signals presented to the drive circuits of vidicon B and to produce a signal to switch 32 so as to connect the output of vidicon B to the input of display tube 42 whenever both horizontal and vertical drive signals to vidicon B are not clipped.

In FIG. 4, line 124 is the same as the similarly numbered line from FIG. 2 and constitutes the input from the limiter 82 of FIG. 2 to the logic circuit 34. Likewise, line 126 in FIG. 4 represents the similarly numbered line in FIG. 2 and constitutes the input to logic 34 from the limiter 116. Also, line 36, the output of logic circuit 34 in FIG. 4, is the same as the similarly numbered line in FIG. 2 and constitutes the control input line to switch 32.

Line 124 is shown connected inside of logic circuit 34 by a line 270 to a limiter test circuit 272 shown in FIG. 4 as a box containing the notation "LMTR Test". Limiter test circuit 272 is a standard circuit that operates whenever the signal at its input is clipped to produce a logical "1" signal at its output and whenever the signal at its input is not clipped to produce a logical "0" at its output. The output of limiter test circuit 272 is shown on a line 274 leading to one terminal of an OR gate 276. Likewise, line 126 is shown connected inside logic circuit 34 by a line 280 to the input of a limiter test circuit 282 shown in FIG. 4 as a box containing the notation "LMTR Test". The limiter test circuit 282, like limiter test circuit 272, is a standard circuit which operates when a signal at its input is clipped to produce a logical "1" at its output and which operates when the signal at its input is unclipped to produce a logical "0" at its output. The output of limiter test circuit 282 is shown on a line 284 leading to the other input terminal of OR gate 276. OR gate 276 will operate whenever a logical "1" exists on either of its input lines 274 or 284 to produce a logical "1" at its output. The output of OR gate 276 is shown on a line 286 which is connected to line 36. Thus, when either the signals on line 124 or 126 are clipped, OR gate 276 will receive a logical "1" at one of its inputs and the output on line 36 leading to switch 32 of FIG. 2 will be a logical "1". On the other hand, if neither the signal on line 124 or the signal on line 126 is clipped, then the outputs of both limiter test circuits 272 and 282 will be logical "0"'s and the output of OR gate 276 and the signal to switch 32 of FIG. 2 will also be a "0". Switch 32 of FIG. 2 will then operate upon the receipt of a logical "1" to connect the output of vidicon A in FIG. 2 to the input of display tube 42 and will operate upon receipt of a logical "0" to connect the output of vidicon B in FIG. 2 to the input of display tube 42.

Figure 5:
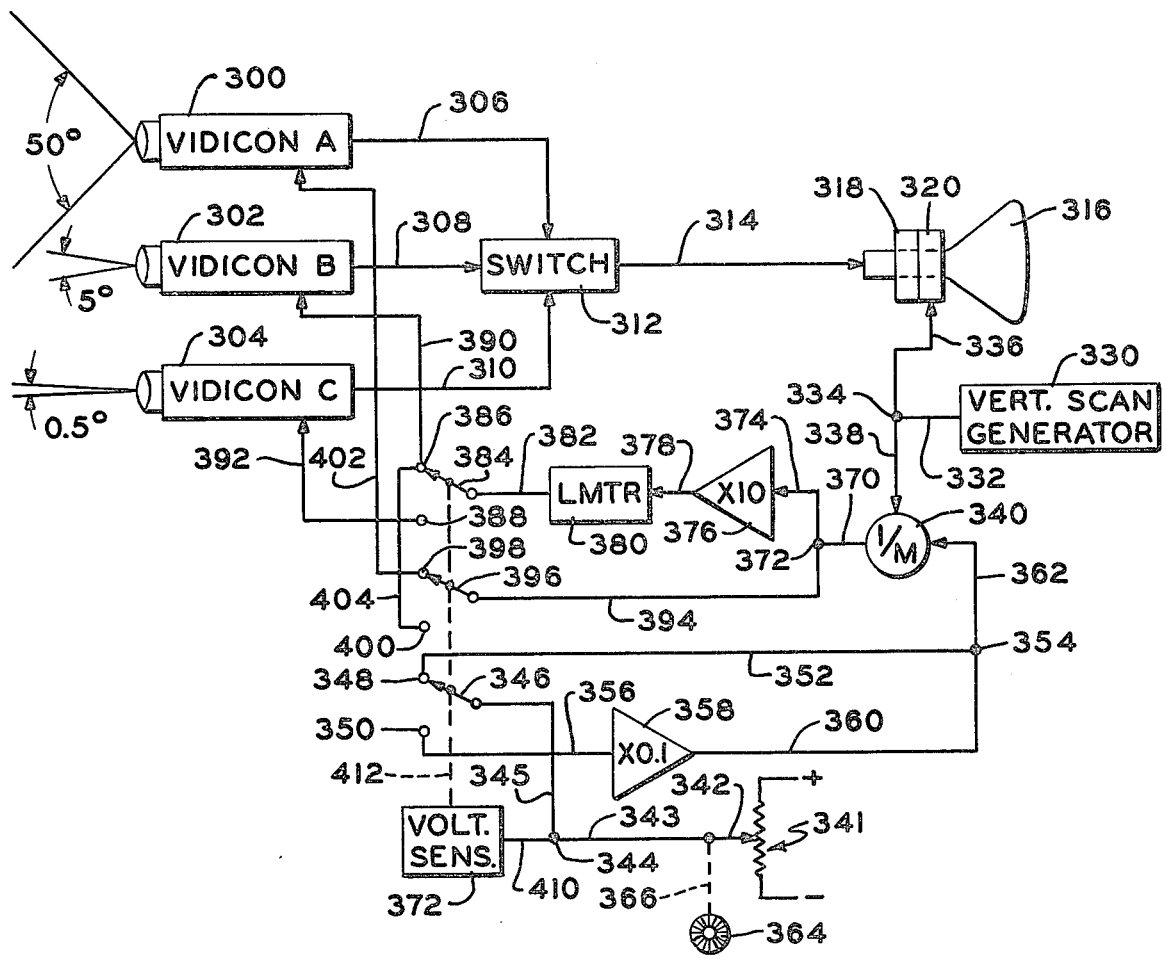
FIG. 5 shows a schematic diagram of an embodiment of the present invention employing three cameras.

It may be desirable to use more than two vidicons so as to zoom over larger numbers of magnifications. For example, if it were desired to zoom from 1 to 100, three cameras could be employed with a first and second camera being used to zoom from 1 to 10 and the second and a third used to zoom from 10 to 100. Referring to FIG. 5, there is described a three camera system wherein a vidicon A, identified by reference numeral 300, is presumed to have a field of view of 50 degrees whereas a vidicon B, identified by reference numeral 302, is presumed to have a field of view of 5 degrees and a vidicon C, identified by reference numeral 304, is assumed to have a field of view of 0.5 degrees. As was the case in connection with FIG. 2, the outputs of all three vidicons appearing on lines 306, 308 and 310 respectively are connected to a switch 312 whose output appearing on line 314 is connected to the input of a monitor tube 316 having horizontal deflection coil 318 and vertical deflection coil 320. For simplicity, since the horizontal and vertical deflection control circuits are the same as was the case with respect to FIG. 2, only the vertical scan portion of the system will be described in connection with FIG. 5. Likewise, since the logic circuitry operating switch 312 is the same as in FIG. 2, it is not shown in FIG. 5. FIG. 5 shows a vertical scan generator 330 having an output on line 332 connected to a junction point 334. Junction point 334 is connected by a line 336 to the vertical coil 320 to drive display tube 316 in the normal manner. Junction point 334 is also connected by line 338 to a variable gain device 340 which may, like the variable gain devices in FIG. 2, operate to divide the vertical scan generator signal by the value M indicative of the desired magnification. This magnification signal is derived as it was in FIG. 2 from a potentiometer identified by reference numeral 341 having a wiper 342 which is connected by a line 343 to a junction point 344 and from there by a line 345 to a switch arm 346 operable between two positions identified as contacts 348 and 350. In the position shown in FIG. 5, switch arm 346 is contacting contact 348 which is connected by a line 352 to a junction point 354. The other switch contact 350 is connected by a line 356 to the input of an amplifier 358 which can operate to multiply the input by a value 0.1 to produce an output on line 360 connected to junction point 354 which is 1/10th of the magnitude of the input. Junction point 354 is connected by a line 362 to an input of the variable gain device 340. As was the case in connection with FIG. 2, the wiper 342 of potentiometer 341 is positioned by the viewer by operating a knob 364 which, by a mechanical connection shown as dashed line 366, moves wiper 342 between the positive and negative portions of the potentiometer 341. Thus, by turning knob 364, the viewer can set the desired magnification into the system. Accordingly, the output of variable gain device 340 on a line 370 will be a replica of the vertical scan generator signal but divided by the magnitude of the signal coming from potentiometer wiper 342. When this signal is of unity value then the output on line 370 will be the same as the output of the vertical scan generator 330 but as the wiper 342 moves to indicate higher magnifications, the size of the signal on line 370 will decrease just as was the case in connection with FIG. 2. Line 370 is connected to a junction point 372 which is connected by a line 374 to the input of an amplifier 376 which operates to multiply the input by a factor of 10 and to produce the amplified signal on its output line 378 which is connected to a limiter 380 identified by a box with the letters "LMTR" therein. Limiter 380 operates as was the case of the limiters in connection with FIG. 2 to clip the signal coming from amplifier 376 whenever it is larger than a predetermined value which is here chosen to be the magnitude of the signal coming from the vertical scan generator 330. The output of limiter 380 is connected by a line 382 to a switch arm 384 operable between two switch contacts 386 and 388 respectively. Switch contact 386 is connected by a line 390 to the vertical scan drive input of vidicon B whereas switch contact 388 is connected by a line 392 to the vertical scan drive input of vidicon C.

Junction point 372 is also connected by a line 394 to a switch arm 396 operable between two switch contacts 398 and 400 respectively. Switch contact 398 is connected by a line 402 to the vertical drive input of vidicon A and switch contact 400 is connected by a line 404 to switch contact 386 and thus via line 390 to the vertical drive input of vidicon B. In the position shown, switch arms 384 and 396 operate to connect the output of limiter 380 and the line 394 to the vertical drive inputs of vidicon A and vidicon B respectively. Thus, with respect to the system thus far described, vidicon A and vidicon B will operate as they did with the two vidicons of FIG. 2. In other words, vidicon A will present its signal to display 316 whenever the drive signal to vidicon B is being clipped so that the wide field of view will be substantially covering the face of display tube 316 whenever the magnification is 1 at which time the drive to vidicon B is clipped during the greater portion of its cycle. As the magnification is increased by the operator up to a level of 10, vidicon B's output more and more fills the center of display tube 316 while vidicon A's output less and less surrounds the periphery thereof. When the potentiometer wiper 342 is moved to a position representative of a magnification of 10, then the output of vidicon B will substantially fill the tube 316 and since the vidicon B signal is no longer being clipped, the output of vidicon A will not have an effect on the screen viewed by the viewer.

Connected to junction point 344 by a line 410 is a voltage sensor 372 shown as a box having the words "volt. sens." therein. The output of voltage sensor 372 is a mechanical connection shown as dashed line 412 which is connected to the switch arms 346, 396 and 384 respectively. Voltage sensor 372 operates when the voltage on potentiometer wiper has reached a point indicative of a magnification of 10 to cause the operation of switch arms 346, 384 and 396 to their lower positions. In their lower positions, the voltage appearing on wiper 342 is passed through the 1/10th amplification amplifier 358 so that now the voltage to the input of the variable gain device 340 will drop back to what it was at a magnification of one. In other words, assuming that potentiometer wiper 342 travelled from a position wherein one volt was being transmitted to variable gain device 340 to a position wherein ten volts representative of a magnification of 10 was being transmitted to variable gain device 340, then when voltage sensor 372 operated at 10 volts, switch arm 346 would transmit the 10 volt signal through the 0.1 amplifier 358 so that the input on line 362 to variable gain device 340 would again be one volt. At this time, the output of the variable gain device 340 on line 370 would again be that of the vertical scan generator 330 with the result that the signal appearing on line 394 would be the same as that appearing out of the vertical scan generator 330. This signal would be presented now through the switch arm 396, lower switch contact 400, line 404, contact 386 and line 390 to the vertical drive input of vidicon B. Meanwhile, the signal from variable gain change device 340 passing through amplifier 376 and limiter 380 would be clipped to a great extent and this signal would be passed through switch arm 384, lower switch contact 388 and line 392 to the vertical drive of vidicon C. The logic circuitry associated with switch 312 would now operate to pass the signal presented by vidicon B through to the display tube 316 at all times when the signal to vidicon C was not being clipped and thus at a magnification of 10 the 5 degree field being viewed by vidicon B would fill up substantially the entire surface of display tube 316. Thereafter, as the operator moves potentiometer wiper 342 further up in voltage, less and less of the signal to vidicon C would be clipped and more and more of the central region of monitor 316 would be filled with the signals from vidicon C and again the system would be operating in the same manner as it was in connection with FIG. 2 but now with vidicons B and C. The end result would be at a magnification of 100 where the output of vidicon B would no longer effect the tube 316 and the scene viewed by vidicon C would now substantially fill the entire screen of monitor 316 with a magnification of 100 and the same resolution of 500 lines used in the example.

While not described, the horizontal scan generator and associated circuitry would be provided in FIG. 5 to operate as it did with respect to FIG. 2 except that the additional voltage sensing circuit and switching circuitry would also be provided for this channel as it has been for the vertical scan channel.

It is seen that the resolution provided on the face of monitor 316 will remain at the 500 lines in the center portion both throughout the operation of vidicons A and B and throughout the operation of vidicons B and C.

As was mentioned earlier in the specification, the system of the present invention can be used with infrared sensors as well as the light sensors of a normal television system. However, with infrared systems which normally do not provide a means of rapidly changing their scan amplitudes as required in this invention as illustrated in FIGS. 3a, 3b and 3c, the outputs of the infrared sensors would first have to be converted by well known scan converters. The readout operation from a scan converter is essentially identical, in principle, to that of a vidicon so that the previously described scan system can be used.

Figure 6:
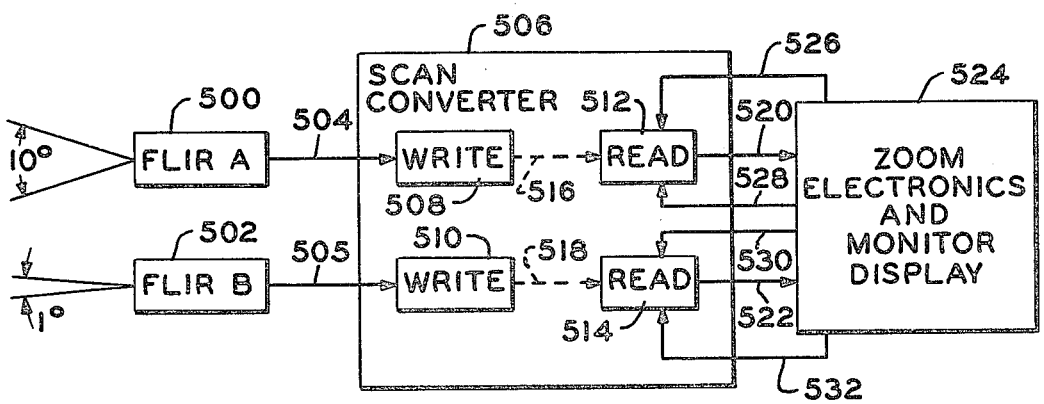
FIG. 6 shows a schematic diagram of a system which may be employed when infrared energy is used.

FIG. 6 shows an infrared monitoring system employing a first infrared sensor 500 identified as a box containing the notation "FLIR A" and having a 10 degree field of view and showing a second infrared sensor 502 identified as a box containing the notation "FLIR B" and having a 1 degree field of view. The output of FLIR A is presented on a line 504 and the output of "FLIR B" is presented on a line 505 both of which are connected to a scan converter 506. Scan converter 506 is a common device in the infrared art. It consists of two double ends of scan converters. One converter contains a "write" circuit identified by box 508 and the second converter a "write" circuit identified by box 510. "Write" boxes 508 and 510 receive the signals from FLIR A and FLIR B and convert the FLIR A and FLIR B pictures into an electronic form, within the converters, that can be accessed by means of a vidicon-like scan system.

Each of the two scan converters in box 506 contain a "read" apparatus. The first is shown as box 512 and the second "read" apparatus is shown as box 514. "Read" boxes 512 and 514 are capable of reading out the pictures generated by the "write" boxes 508 and 510 as is shown in FIG. 6 by dashed lines 516 and 518 respectively. In the example here, "read" boxes 512 and 514 take the place of the vidicon cameras A and B of FIG. 2 and view the outputs of the scans produced by FLIRs A and B and the "write" boxes 508 and 510. The output of "read" box 512 is shown on a line 520 and the output of "read" box 514 is shown on a line 522. Lines 520 and 522 are shown connected to a box 524 labelled "zoom electronics and monitor display". Box 524 has four outputs on lines 526, 528, 530 and 532 respectively. Lines 526 and 528 are connected to "read" box 512 and lines 530 and 532 are connected to "read" box 514. The zoom electronics and monitor display in box 524 is the same as that shown in FIG. 2 with "read" box 512 taking the place of vidicon A, "read" box 514 taking the place of vidicon B, line 526 taking the place of line 74, line 528 taking the place of line 108, line 530 taking the place of line 88 and line 532 taking the place of line 122 and accordingly further description of FIG. 6 is not believed necessary.

It is thus seen that I have provided a system for zooming a television display under the control of the viewer and without effective loss of resolution. Many modifications to the specific disclosures used in connection with the preferred embodiments will occur to those skilled in the art. For example, as was mentioned earlier, the vidicons shown may have different fields of view than those described, the amounts of magnification need not be those chosen in connection with the preferred embodiments, the number of scan lines used may vary and while all 500 scan lines were written on the display in sequence, the two frame system of normal TV's could be used whereby all odd numbered lines would be written on the display and then all even numbered lines written in between the odd numbered lines in an interlacing arrangement. Likewise, the logic circuit of FIG. 4 could be replaced with other circuitry with the skill of those in the art and where it is shown at a "1" and a "0" signal to the switch 32 of FIG. 2 operates to connect vidicon A and vidicon B respectively to the display tube it could be reversed so that a "0" and a "1" signal had that effect. Furthermore, systems with four or more cameras could be devised and alternate logic circuitry and switching circuitry could be employed. I therefore do not wish to be limited by the disclosures used in connection with the preferred embodiment, but rather intend only to be limited by the following claims.

The embodiments of the invention in which an exclusive property or right is claimed are defined as follows:

1. Apparatus for use in an electronic zoom system comprising in combination:
   first vidicon camera means having drive input means, output means and having a first field of view;
   second vidicon camera means having drive input means, output means and having a second field of view which is less than the first field of view;
   scan generating means operable to produce a scan signal;
   signal generating means operable to produce a magnification signal of magnitude that changes with a desired magnification;
   signal modifying means having a first input connected to said scan generating means to receive the scan signal, having a second input connected to said signal generating means to receive the magnification signal and operable to produce a drive signal representative of the scan signal divided by the magnification signal;
   first means connecting the drive input means of said first vidicon camera to said signal modifying means to receive the drive signal;
   clipping means connected to said signal modifying means to receive the drive signal and to produce a further signal representative of the drive signal clipped by an amount which varies with the magnitude of the drive signal; and
   second means connecting the drive input means of said second vidicon camera to said clipping means to receive the further signal.

2. Apparatus according to claim 1 including display means having a drive input connected to said scan generating means to receive the scan signal and having a signal input; and switch means selectively connecting the output means of the first and second vidicon cameras to the signal input of said display means.

3. Apparatus according to claim 2 further including logic means connected to said clipping means to receive the further signal and to produce a switch signal whenever the further signal is clipped and means connecting said switch means to said logic means to receive the switch signal, said switch means connecting the output means of the first vidicon camera to the signal input of said display means when the switch signal is indicative of the further signal being clipped and connecting the output means of the second vidicon camera to the signal input of said display means when the switch signal is indicative of the further signal being unclipped, said display means predominantly displaying the field of view of said first vidicon camera when the further signal is clipped and displaying the field of view of said second vidicon camera to an extent which increases as the clipping of the further signal decreases.

4. Apparatus according to claim 3 including means boresighting said first and second vidicon cameras so that the second field of view is substantially in the center of the first field of view.

5. Apparatus according to claim 2 including third vidicon camera means having drive input means, output means and having a third field of view which is less than the second field of view; selective means connected to said signal generating means, to said first means and to said second means and operable above a predetermined magnitude of the magnification signal to disconnect said signal modifying means from the drive input means of said first vidicon camera, to disconnect said clipping means from the drive input means of said second vidicon camera, to connect the drive input means of said second vidicon camera to said signal modifying means to receive the drive signal and to connect the drive input means of said third vidicon camera to said clipping means to receive the further signal.

6. Apparatus according to claim 5 including signal reducing means having an input and an output and operable to produce at the output a signal representative of a signal at the input reduced by a predetermined amount, said selective means disconnecting the second input of said signal modifying means from the signal generating means and connecting said reducing means between said signal generating means and the second input of said signal modifying means when the magnification signal exceeds the predetermined magnitude.

7. Apparatus according to claim 6 including logic means connected to said clipping means to receive the further signal and to produce a switch signal whenever the further signal is clipped and means connecting said switch means to said logic means to receive the switch signal, said switch means connecting the output means of the first vidicon camera to the signal input of said display means when the switch signal is indicative of the further signal being clipped and connecting the output means of the second vidicon camera to the signal input of said display means when the switch signal is indicative of the further signal being unclipped when the magnification signal is below the predetermined magnitude, said display means predominately displaying the field of view of said first vidicon camera when the further signal is clipped and displaying the field of view of said second vidicon camera to an extent which increases as the clipping of the further signal decreases and when the output signal is above the predetermined magnitude, said display means predominately displaying the field of view of said second vidicon camera when the further signal is clipped and displaying the field of view of said third vidicon camera to an extent which increases as the clipping of the further signal decreases.

8. Apparatus according to claim 7 including means boresighting said first, second and third vidicon cameras so that the third field of view is substantially in the center of the second field of view and the second field of view is substantially in the center of the first field of view.

9. Apparatus for use in an electronic scan system comprising:
 a first infrared radiation sensor having a first field of view and an output;
 a second infrared radiation sensor having a second field of view and an output;
 infrared scan converter means including a first write circuit connected to the output of said first infrared sensor and producing an output, a second write circuit connected to the output of said second infrared sensor and producing an output, a first read circuit receiving the output of the first write circuit, said first read circuit having a drive input and having an output representative of the first field of view and a second read circuit receiving the output of the second write circuit, said second read circuit having a drive input and having an output representative of the second field of view;
 scan generating means operable to produce a scan signal;
 signal generating means operable to produce a magnification signal of magnitude that changes with the desired magnification;
 signal modifying means having a first input connected to said scan generating means to receive the scan signal, having a second input connected to said signal generating means to receive the magnification signal and operable to produce a drive signal representative of the scan signal divided by the magnification signal;
 first means connecting the drive input of the first read circuit to the signal modifying means to receive the drive signal;
 clipping means connected to said signal modifying means to receive the drive signal and to produce a further signal representative of the drive signal clipped by an amount which varies with the magnitude of the drive signal; and
 second means connecting the drive input of the second read circuit to said clipping means to receive the further signal.

10. Apparatus according to claim 9 including display means having a drive input connected to said scan generating means to receive the scan signal and having a signal input; and switch means selectively connecting the outputs of the first and second read circuits to the signal input of said display means.

11. Apparatus according to claim 10 further including logic means connected to said clipping means to receive the further signal and to produce a switch signal whenever the further signal is clipped and means connecting said switch means to said logic means to receive the switch signal, said switch means connecting the output of the first read circuit to the signal input of said display means when the switch signal is indicative of the further signal being clipped and connecting the output of the second read circuit to the signal input of said display means when the switch signal is indicative of the further signal being unclipped, said display means predominately displaying the field of view of said first infrared radiation sensor when the further signal is clipped and displaying the field of view of said second infrared radiation sensor to an extent which increases as the clipping of the further signal decreases.

* * * * *